United States Patent [19]

Lee et al.

[11] Patent Number: 5,515,040

[45] Date of Patent: May 7, 1996

[54] METHODS OF SELF-CALIBRATION FOR A KEY-TYPE MOUSE

[75] Inventors: Hyung J. Lee, Seoul; Byung T. Kim, Kyungki-Do, both of Rep. of Korea

[73] Assignee: Sejin Electron, Incorporated, Seoul, Rep. of Korea

[21] Appl. No.: 128,374

[22] Filed: Sep. 28, 1993

[51] Int. Cl.⁶ .................................................. G08C 15/06
[52] U.S. Cl. .............................. 340/870.04; 340/870.38; 341/20; 341/22; 345/168
[58] Field of Search .................... 340/870.04, 870.38; 341/20, 22, 26, 34; 364/571.01; 345/168, 174; 73/1 R, 1 B, 862.622

[56] References Cited

U.S. PATENT DOCUMENTS

| | | | |
|---|---|---|---|
| 4,680,577 | 7/1987 | Straayer et al. | 345/160 |
| 5,124,689 | 6/1992 | Franz et al. | 345/160 |
| 5,184,120 | 2/1993 | Schultz | 340/870.04 |
| 5,252,971 | 10/1993 | Franz et al. | 341/26 |

OTHER PUBLICATIONS

"System Builder's Design Guide for Home Row's J-Mouse", Home Row, Inc., Document No. 280–002–03, pp. 1–18.

"Force and Position Sensing Resistors", Interlink Electronics, Feb., 1990, Technical Overview, Dr. Yaniger, Stuart, pp. 1–4.

Primary Examiner—Brent A. Swarthout
Assistant Examiner—Andrew Hill
Attorney, Agent, or Firm—Law Offices of Douglas A. Chaikin

[57] ABSTRACT

This invention relates to methods of self-calibration for computer display cursor positioning devices imbedded within a computer keyboard key (sometimes referred to herein as a "key-type mouse") or other pointing device. A plurality of Force Sensitive Resistor grids ("FSRs") or other pressure sensitive sensors are used to detect relative pressure applied in various directions to a predetermined key of a computer keyboard. An RC circuit is used to indirectly read the values of the FSRs. A predetermined delay period is associated with each sensor followed by a measurement period. The resistance of the FSR is related to the measurement period taken to reach a given voltage value after the predetermined delay period. A positive or negative offset to the predetermined delay period adjusts the time necessary for the RC circuit to reach a predetermined bias voltage value. By breaking the charging time into a delay period and a measurement period the amount of time that the keyboard controller or microprocessor must spend devoted to watching the voltage across the RC circuit for the moment when it reaches $V_{CC}$ is reduced, improving the operation of the keyboard.

2 Claims, 12 Drawing Sheets

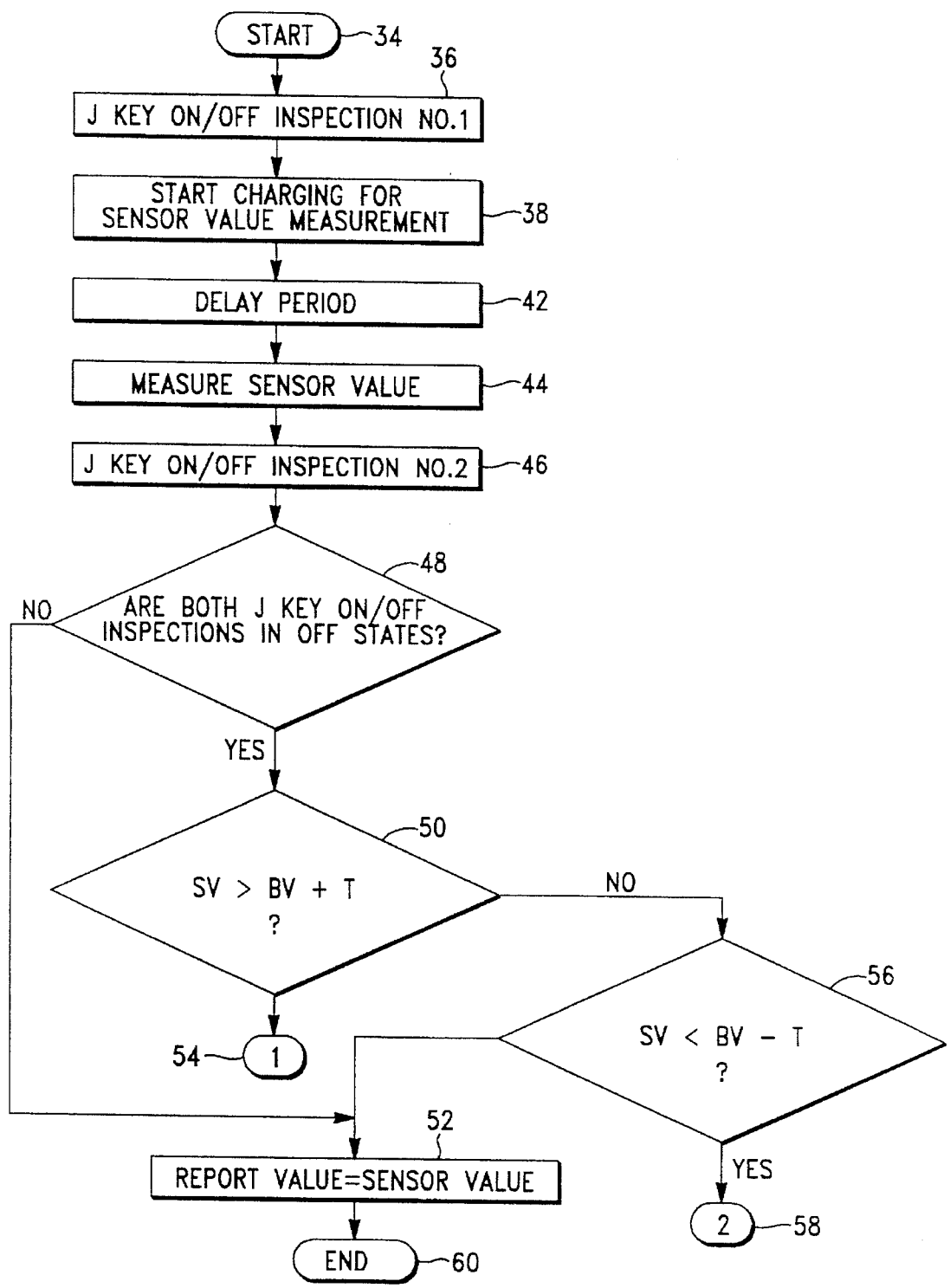
FIG.—5A

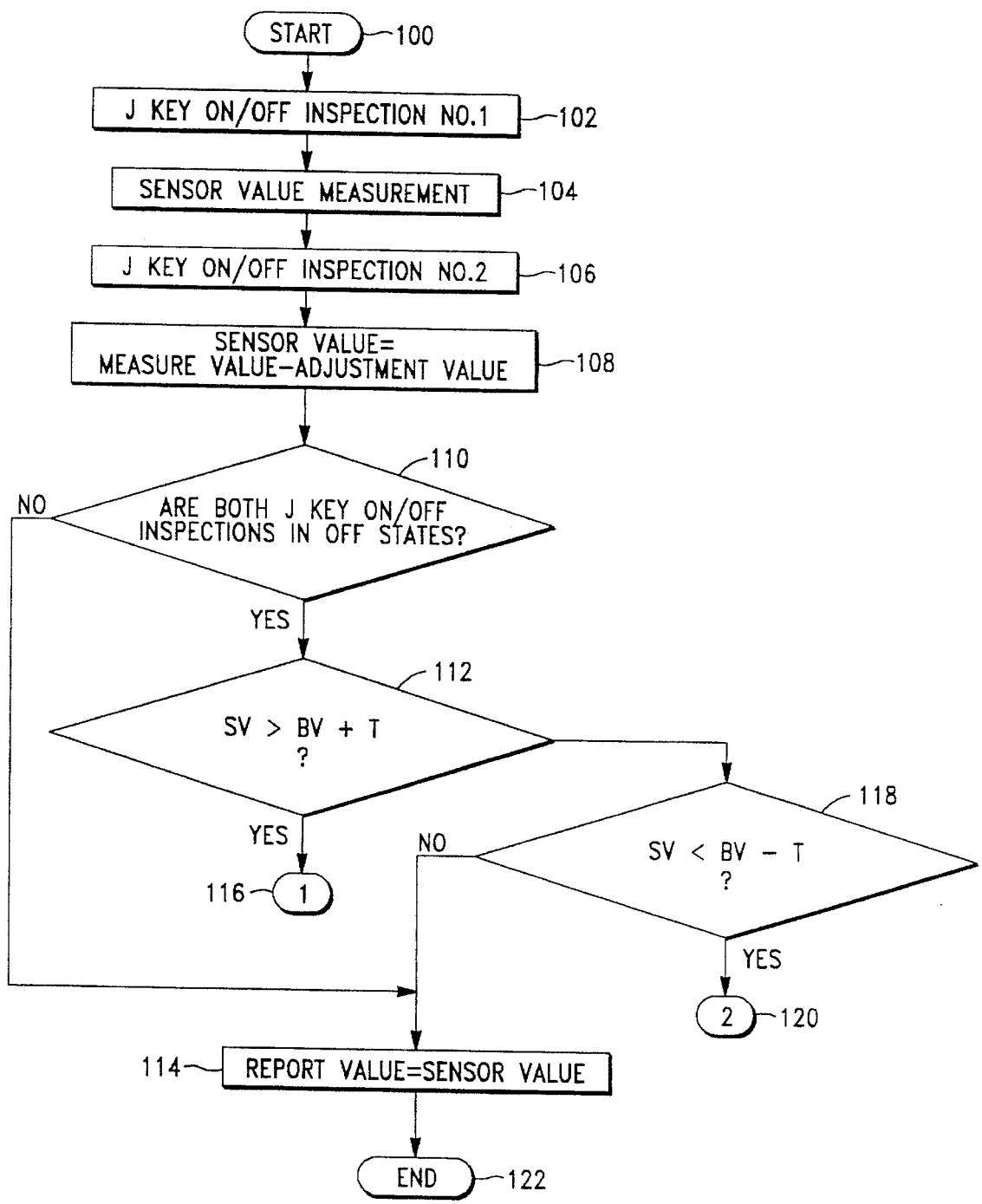
FIG.−6A

METHODS OF SELF-CALIBRATION FOR A KEY-TYPE MOUSE

BACKGROUND OF THE INVENTION

1. Field of the Invention

The present invention relates to self-calibration methods for a key-type computer mouse or cursor positioning device which derives its positioning information from pressure sensors. More particularly, the present invention is directed to automatic calibration methods for a force sensitive resistor-based cursor positioning device embedded in a computer keyboard or pointing device.

2. The Prior Art

The development of graphical user interfaces for personal computers has resulted in a demand for cursor positioning devices more versatile than the traditional cursor keys (arrow keys) included in almost all computer keyboards. Mice, joy sticks and track balls have all been adapted for use with personal computers. Yet, all of these devices require that the hand that types on the keyboard be moved away from the keyboard in order to provide input to the computer from the mouse, joy stick or track ball which is often relatively distant from the keys of the keyboard. U.S. Pat. No. 5,124,689 to Franz et al. discloses a cursor control device embedded in a computer keyboard. Four force sensitive resistor grids (FSRs) may be coupled to one of the computer keys, for example, the "J" key. Key contact closures and FSR output values are monitored to determine when the J key is pressed and pushed in a particular direction for use in cursor control as opposed to as a typed "J". Data from the FSRs is processed to direct movement of the cursor displayed on an associated computer display.

The prior art, however, does not take into account the fact that FSR-type sensors are subject to many forces and effects which cause their nominal output values to drift over time. For example, changes in temperature, humidity, atmospheric pressure and position can all cause the output values of an FSR sensor to change regardless of how carefully it was aligned to begin with. This can result in reduced dynamic range as the sensor drifts toward one or the other of the limits of its output values. Accordingly, actual implementation of a key-type mouse employing FSR-type sensors requires some kind of automatic calibration method in order to reliably obtain sufficient dynamic range out of the sensors in order to successfully direct a cursor on a computer display.

BRIEF DESCRIPTION OF THE INVENTION

This invention relates to methods of self-calibration for computer display cursor positioning devices imbedded within a computer keyboard key (sometimes referred to herein as a "key-type mouse") or other pointing device. A plurality of Force Sensitive Resistor grids ("FSRs") or other pressure sensitive sensors are used to detect relative pressure applied in various directions to a predetermined key of a computer keyboard. Because the sensors give varying values over time due to changing physical conditions such as temperature, humidity, atmospheric pressure and physical orientation of the sensor, a method of continuously calibrating the sensors is required. Two methods are provided herein. The method preferred for use depends upon the manner in which the value of the FSR is determined.

According to the first method, termed the Delay Value Calibration Method, while the key is not depressed, the calibration routine runs, when the key is depressed for use in cursor control, the calibration values resulting from the last pass of the calibration routine are used. In accordance with this method, an RC circuit is used to indirectly read the values of the FSRs. A predetermined delay period is associated with each sensor followed by a measurement period. The resistance of the FSR is related to the measurement period taken to reach a given voltage value after the predetermined delay period. A positive or negative offset to the predetermined delay period adjusts the time necessary for the RC circuit to reach a predetermined bias voltage value. By breaking the charging time into a delay period and a measurement period the amount of time that the keyboard controller or microprocessor must spend devoted to watching the voltage across the RC circuit for the moment when it reaches $V_{CC}$ is reduced, improving the operation of the keyboard.

According to the second method, termed the Adjustment Value Calibration Method, while the key is not depressed, the calibration routine runs, when the key is depressed for use in cursor control, the calibration values resulting from the last pass of the calibration routine are used. In accordance with this method the values of the pressure sensors are directly read with an analog/digital converter. A predetermined adjustment value is associated with each sensor. A positive or negative offset to this predetermined adjustment value allows the corrected measured sensor value to reach a predetermined bias value.

BRIEF DESCRIPTION OF THE DRAWINGS

FIGS. 5A and 5B are flow charts describing the Delay Value Calibration Method of self-calibration of the present invention.

FIGS. 6A and 6B are flow charts describing the Adjustment Value Calibration Method of self-calibration of the present invention.

DETAILED DESCRIPTION OF THE PREFERRED EMBODIMENTS

Those of ordinary skill in the art will realize that the following description of the present invention is illustrative only and not in any way limiting. Other embodiments of the invention will readily suggest themselves to such skilled persons.

The present invention comprises two different automatic self-calibration methods for use with a key-type mouse installed below a typing key in a computer keyboard. Key-type mice of this sort are described in detail in U.S. Pat. No. 5,124,689 to Franz et al. and assigned to Home Row, Inc. and U.S. Pat. No. 4,680,577 to Straayer et al. and assigned to Tektronix, Inc. Both U.S. Pat. Nos. 5,124,689 and 4,680,577 are hereby incorporated herein by reference as if set forth fully herein. The hardware implementation of a key-type mouse is further described in "System Builder's Design Guide for Home Row's J-Mouse" and incorporated herein by reference as if set forth fully herein.

Both of the methods described herein involve automatic calibration for force sensors based upon FSRs. FSRs are preferred herein because of their long service life and output characteristics. FSRs of the type used herein may be obtained from Interlink Electronics of Carpinteria, Calif. A broad description of FSRs is contained in the brochure entitled "Force and Position Sensing Resistors" available from Interlink Electronics and hereby incorporated herein by reference as if set forth fully herein.

Figure 1:
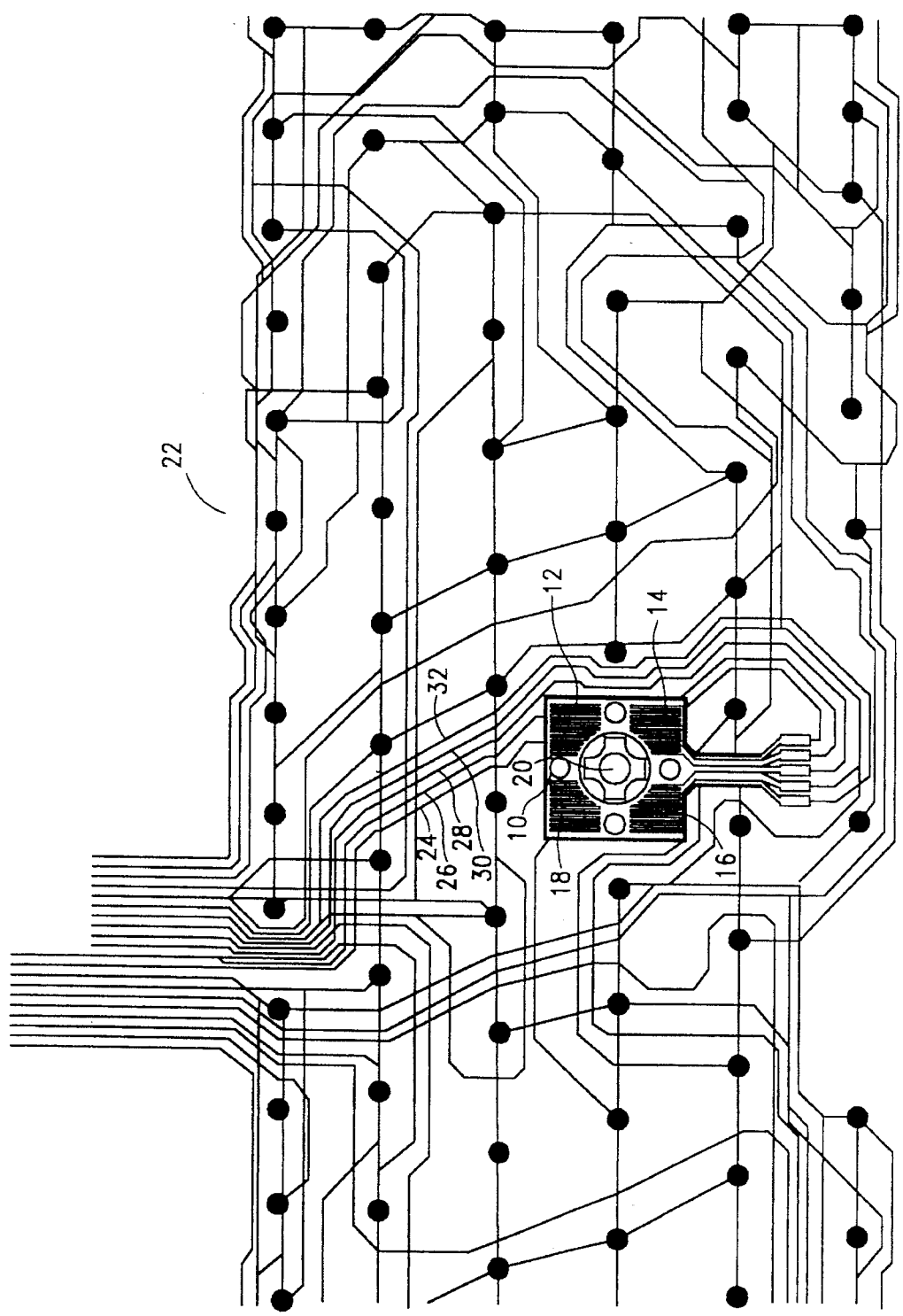
FIG. 1 is a diagram showing the installation of a key-type mouse FSR sensor array on a computer keyboard printed circuit board.

Turning now to the drawings, FIG. 1 is a diagram showing the installation of a key-type mouse FSR sensor pad 10 containing four sensor grids 12, 14, 16 and 18 located at a computer keyboard contact 20 on a computer keyboard printed circuit board 22. As can be seen from FIG. 1, five separate circuit traces 24, 26, 28, 30 and 32 (one for each FSR grid and a common line) connect FSR sensor pad 10 to processing circuitry (not shown).

Pressing the key of the key-type mouse (for example, the "J" key) for more than a predetermined amount of time and simultaneously pushing the key in a direction causes the keyboard controller to recognize that cursor control input is intended. According to a preferred embodiment of the present invention, the analog to digital converters associated with each sensor provide a value between 0 and 106.

For example, if the pressure is applied to an edge of the J key cap, the sensor directly under that edge of the J key cap will generate a value close to 106 and the sensor directly opposite that edge will generate a value close to 0 depending on how much pressure is applied.

Temperature, humidity, atmospheric pressure and positioning of the keyboard affect the pressure sensing values. Ideally, in this preferred embodiment, a sensor value of 53 (½ of full scale) would be an ideal output when no pressure is being exerted on the J key. In this way, the maximum dynamic range would be available to measure pressure (either positive or negative) applied to the sensors by flexure of the key cap. In the absence of an automatic calibration system, the pressure sensing values are capable of drifting more than an acceptable amount. For example, if the initial values of the pressure sensors with no external pressure drift to an extreme in this example, the range of values which the pressure sensors can generate in response to applied pressure will be narrowed. Accordingly, significant drift can reduce the dynamic range available from the sensor and reduce the effectiveness of this mechanism for controlling a computer cursor.

Since the "rest" values of the pressure sensors vary as mentioned above, it is very difficult to physically maintain the initial values of the pressure sensors at a constant value. Even when accurate initial values are achieved through careful physical adjustment at the time of manufacture, the sensor values will vary as the keyboard is moved and used and as atmospheric pressure and temperature and humidity change.

The present invention is essentially directed at constantly providing updated offset values for the respective sensor values so that a maximum dynamic range is always available to measure applied pressure to the four sensors thus correcting the problems noted above. The calibration is carried out with a microprocessor installed in the keyboard.

Prior to describing the novel calibration methods, we will discuss first how the FSR sensor signals are measured according to the prior art.

FSR sensor pad 10 provides an analog signal which must be digitized. This can be accomplished in a number of ways all of which have design trade offs of cost, component count and power consumption.

A first method in which the FSR sensors may be read is with an on-chip 8 bit analog to digital converter. This requires the use of a keyboard controller that includes a built in A/D converter. It is the simplest, most cost effective method using the least amount of board space. Another advantage is that only four A/D channels are needed to control the A/D conversion of the force sensor.

Such CMOS based keyboard controllers are: Motorola 68HC11; Signetics 80C552, 83C752, 83C550 and 83C562; Texas Instruments TMS370C350, TMS370C332, TMS370C352, and TMS370C356; NEC µPD78C11 and µPD78C14; and Intel 80C51GB and 80C51SL. Signetics and Intel parts are compatible with the 8051 (MCS-51) family of microcontrollers. If keyboard software has been written for this processor, then one of these controllers can be used and maintain code compatibility while just adding the additional code for the force sensor, thus avoiding rewriting existing code for a new controller.

Figure 2A:
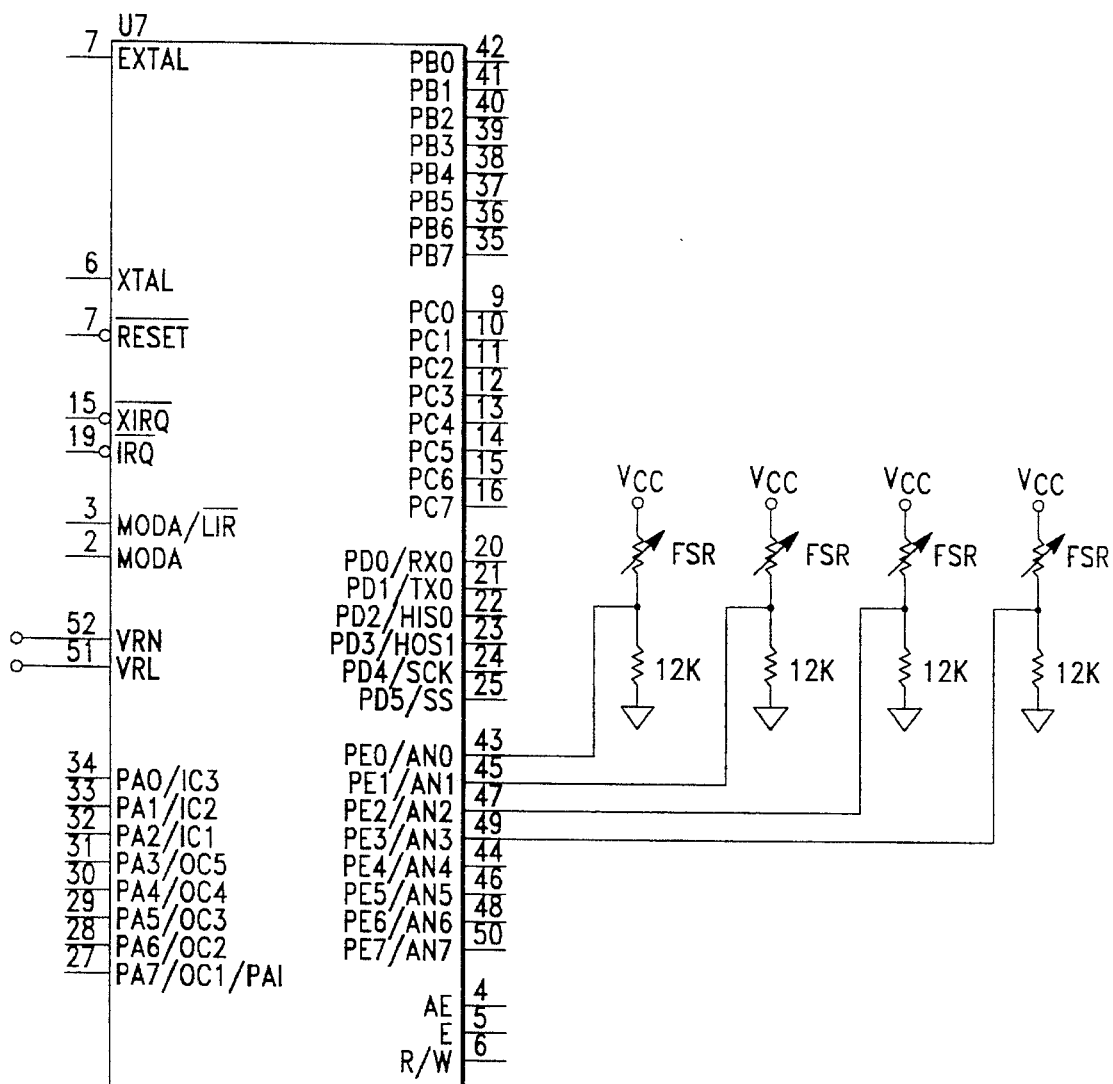
FIG. 2A is an example circuit for analog to digital conversion of FSR sensor signals using a Motorola 68HC11 keyboard controller chip with on-board A/D converters.
Figure 2B:
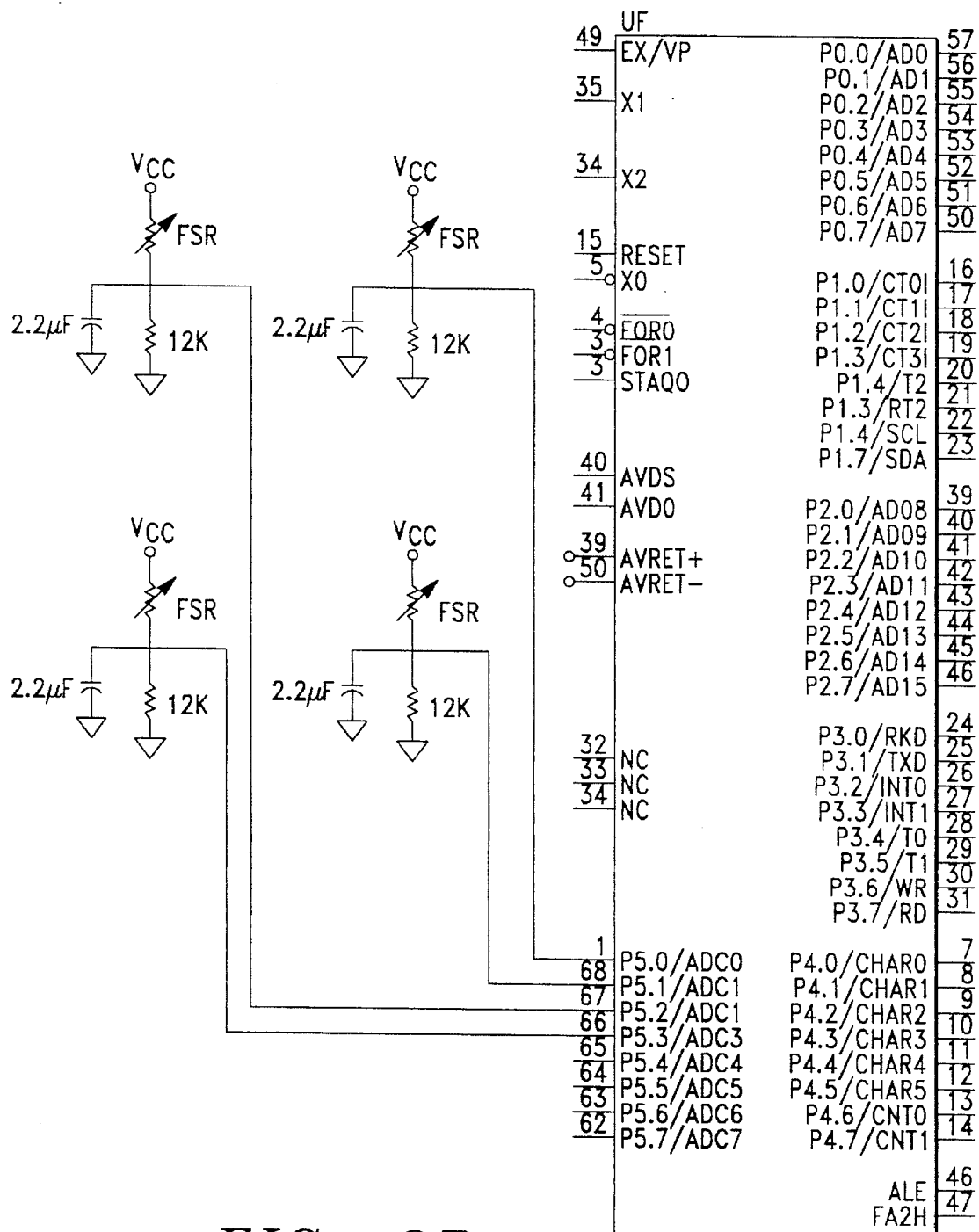
FIG. 2B is an example circuit for analog to digital conversion of FSR sensor signals using a Signetics SOC552 keyboard controller chip with on-board A/D converters.

A simple voltage divider network is all that is necessary to capture force data from the force sensor. See, e.g., FIGS. 2A and 2B. The common connection from the force sensor should be connected to $V_{CC}$, a divider resistor is then connected from each force sensor grid lead to ground. A/D inputs are then connected to the intersection of the force sensor grid and it's associated divider resistor. If a microcontroller without built-in sample and hold is used, a 2.2 µF capacitor should be connected across the divider resistor to limit susceptibility to A/D conversion errors due to a rapid voltage swing. The addition of this capacitor will also assist in protection from radiation from external sources (RFI).

If a device is used with only one A/D channel available, some sort of multiplexing methodology will need to be implemented. At least 2 port bits will be needed to select the force sensor to be scanned. When an external multiplexing design is used only a single divider resistor is needed for a single channel A/D channel. Some adjustment of the A/D voltage range may be necessary in order to achieve adequate sensitivity. This is only necessary for $V_{LOW}$ and is accomplished by adjusting the A/D range to swing between $V_{LOW}$ and $V_{CC}$. This will also eliminate a dead range between 0 V and $V_{LOW}$ also improving A/D resolution.

A second method which may be used is to implement an external 8-bit analog to digital converter. These are widely available in many different packages and technologies. This method has the advantage of not having to use one of the more complex microcontrollers. The same 80C51 can be used but with roughly the same impact on software as the single chip solution with built-in A/D. Multiplexed 4 and 8 channel A/D converters exist that are easily connected to a microcontroller. This method requires more port bits to control it, especially if a parallel output device is used. Several multi-channel devices also exist that can dramatically reduce the port bits needed.

Figure 3A:
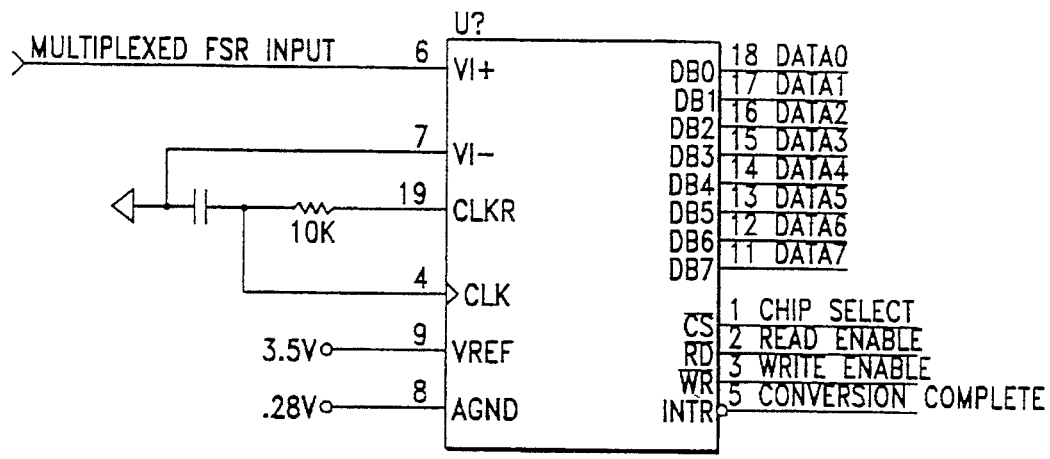
FIG. 3A is an example circuit for analog to digital conversion of FSR sensor signals using an external A/D converter such as a National Semiconductor ADC0805 A/D converter.
Figure 3B:
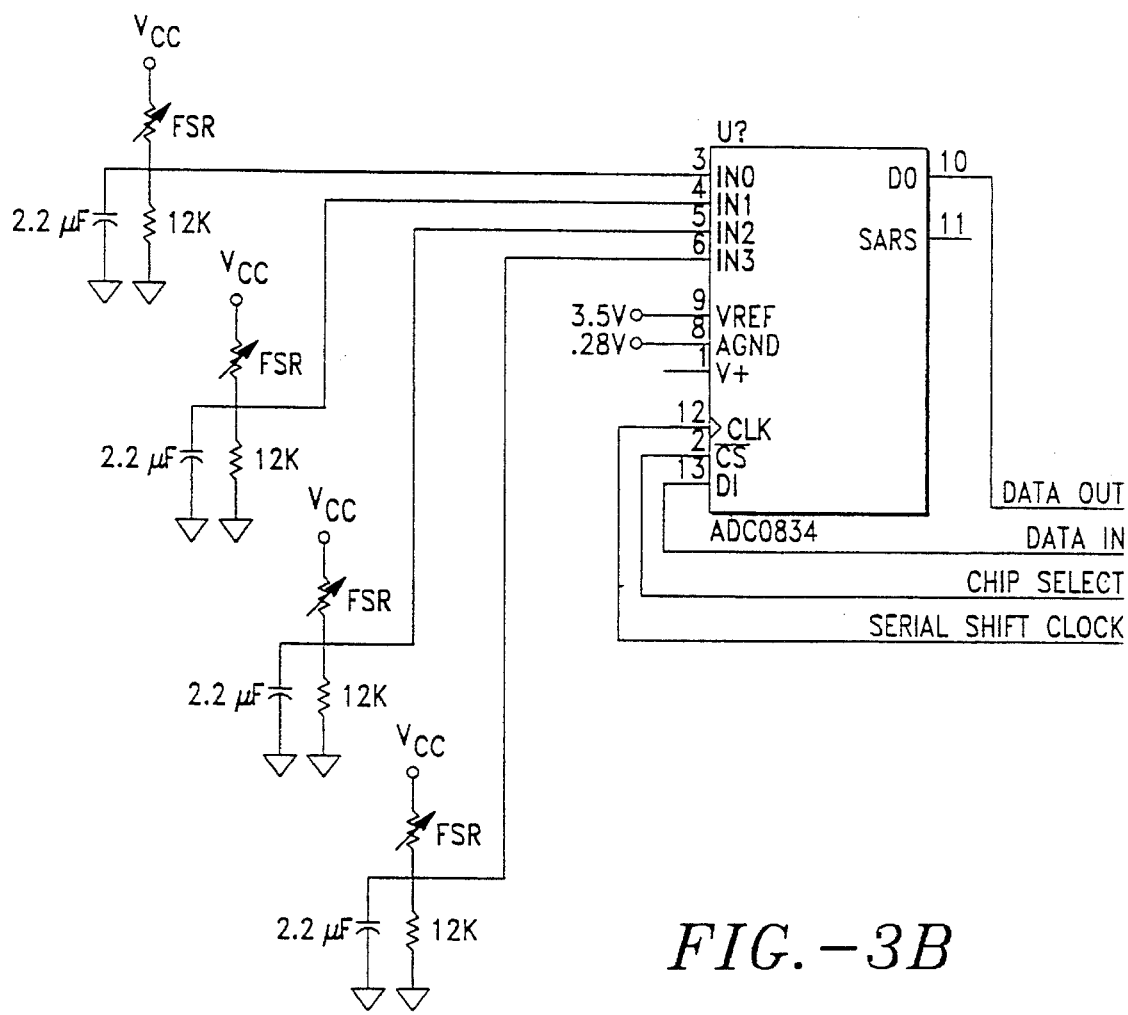
FIG. 3B is an example circuit for analog to digital conversion of FSR sensor signals using an external A/D converter such as a National Semiconductor ADC0834 or ADC0833 A/D converter.

The force sensor interface is, as before, straightforward and simple. A voltage divider circuit is all that is needed with a 2.2 µF capacitor across the divider resistor to ground for A/D converters without built-in sample and hold. See, for example, FIGS. 3A and 3B. As mentioned above, the A/D range should be adjusted to eliminate the dead range between 0 V and $V_{LOW}$. Single input A/D converters will need to have some sort of multiplexing to accommodate the four sensor grids. Devices that can be used are: National Semiconductor ADC0805, ADC0833, ADC0834, and ADC0844; Maxim MAX154; Linear Technologies LTC1099; and Texas Instruments TLC543, ADC0805 and ADC0834. A large number of A/D converters exist and those listed above represent a small sample. Depending on how many port bits can be utilized will determine which converter may be used.

Figures 4A, 4B:
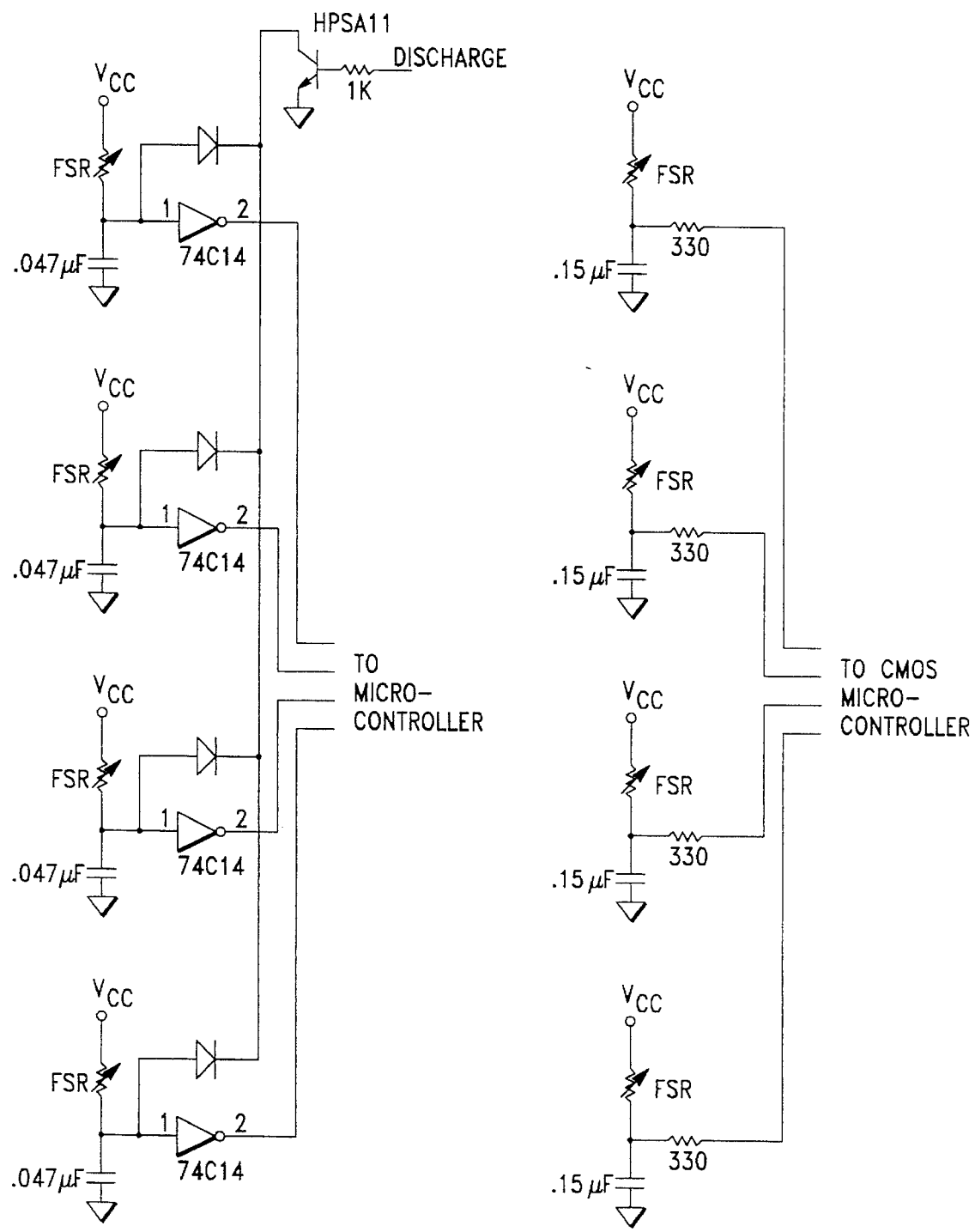
FIG. 4A is an example circuit for analog to digital conversion of FSR sensor signals using charged capacitor conversion and a non-CMOS microcontroller.
FIG. 4B is an example circuit for analog to digital conversion of FSR sensor signals using charged capacitor conversion and a CMOS microcontroller.

A third method for obtaining the sensor data is called "Charged Capacitor Conversion" which represents the simplest hardware interface at the cost of increased power consumption. Examples of Charged Capacitor Conversion circuits are shown at FIGS. 4A and 4B. The force sensor common lead is connected to $V_{CC}$ with the other four leads connected to a capacitor. The intersecting node between the capacitor and the force sensor is then connected to a True CMOS device input either on the microcontroller or external device (74C14). From a discharged state the capacitor is allowed to charge at a rate governed by the force sensor resistance (depends upon pressure applied). A software counter in the microcontroller is decremented while charging occurs. When the capacitor charges up to the CMOS high input threshold voltage, the microcontroller will stop it's counter and a value corresponding to the RC time constant produced by the resistor/capacitor network results. Another portion of the circuit allows the microcontroller to discharge the capacitor.

FIG. 4A shows a circuit for scanning FSRs for a non-CMOS microcontroller. Setting the discharge control to a "1" will discharge the capacitors. Setting the discharge control to a "0" will begin a charging period. FIG. 4B shows a circuit for scanning FSRs with a CMOS microcontroller. Setting the port bit to a "0" will discharge the capacitors. Setting the port bit to a "1" will begin a charging period.

This technique provides for a relatively inexpensive conversion technique at some cost to the keyboard scanning rate. This is due to the fact that the microcontroller must continually sit in a loop and watch for the port bit to change. This MUST be uninterrupted time since any disturbance will cause an incorrect count. Keyboard scanning cannot be performed while measuring a force sensor nor can data be received from the PC as this also would influence the conversion count. At a maximum processor speed of 12 MHz it can take as long as 5.1 ms to complete a conversion of four force sensor grids in a 2 instruction loop. Adding in the fact that the force sensor grids need to be scanned at a minimum rate of 15 scans (all four force sensor grids) per second results in about 77 ms for every second needed for force sensor scanning. This can become significant in keyboard scanning and can have a detrimental effect on keyboard performance. For slower clock rates, this can become an even more pronounced problem.

While the above-described methods of analog/digital conversion are well known to those of skill in the art, the methods of self-calibration are new and extremely useful for implementing a practical FSR-type key-type mouse. It is to be noted that while a preferred embodiment of the present invention is to, in effect, turn the J key (or other predetermined computer key) into a pointing device, the invention will work as well if used in conjunction with a non-typing stand-alone pointing device.

DETAILED DESCRIPTION OF THE TWO CALIBRATION METHODS

Delay Value Calibration Method

FIG. 5A is a flow chart of a computer program which varies the offset to a predetermined delay period to allow the initial pressure value of the pressure sensor to reach a bias reference value. The value of the pressure sensor is measured indirectly using Charged Capacitor Conversion described above. Specifically, the total charging time consists of a predetermined delay period plus or minus an offset (collectively referred to as a delay value) and an actual measurement period (referred to as a sensor value). In case the difference between the actual measurement period (sensor value) and the bias reference value exceeds the predetermined tolerance, adjustment of the delay time varies the actual measurement time to contain the difference within the tolerance.

Turning now to FIG. 5A the Delay Value Calibration Method is described in detail. The routine is entered at block 34. Control transfers to block 36 where the switch status of the J key is checked. OFF means that the J key is not depressed; ON means that it is depressed. The status is saved for future reference as "Inspection No. 1".

Figure 9:
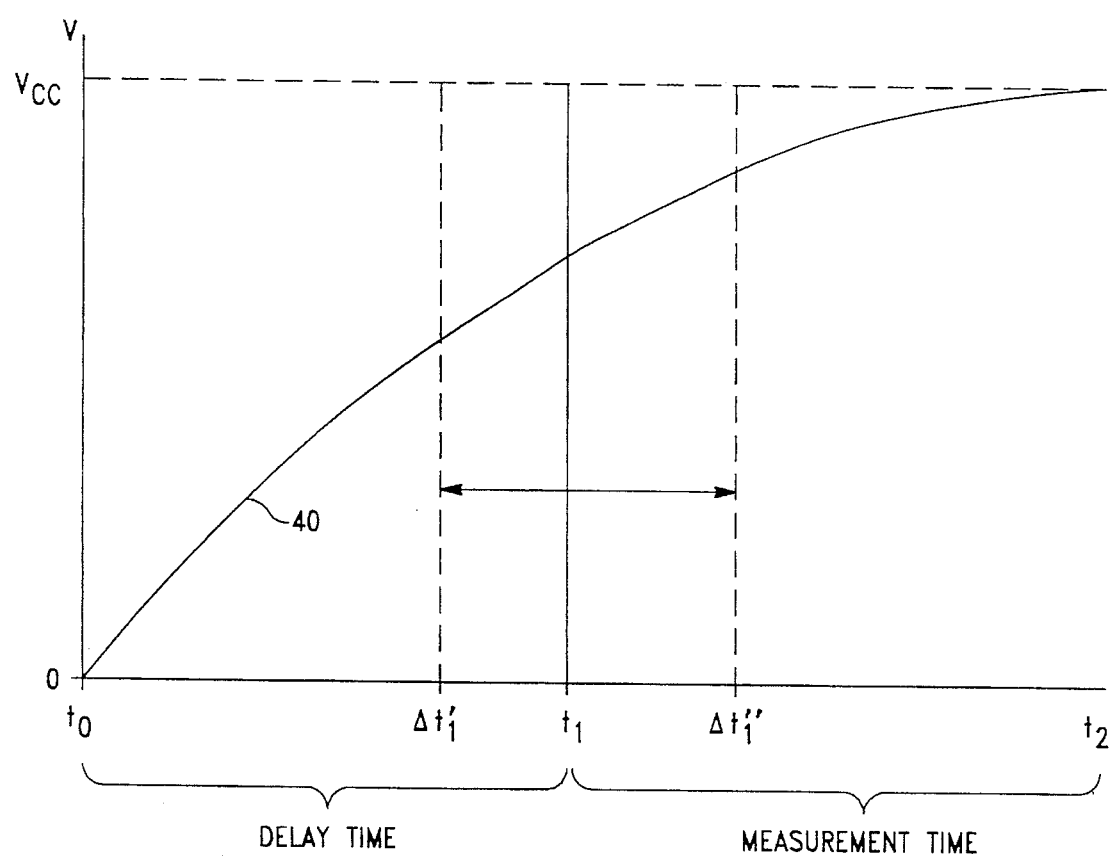
FIG. 9 is a diagram describing the charged capacitor conversion method.

Control now transfers to block 38 where the capacitor starts charging through the RC circuit as described above in reference to Charged Capacitor Conversion. An improvement provided by this method allows the charging period to be divided into two portions: a first portion termed the "delay period" where charging takes place for a predetermined period of time followed by a second portion termed the "measurement period" where time measurement is carried out by the microprocessor as described above. These periods are diagrammed in FIG. 9. Voltage 40 on the capacitor rises from 0 to $V_{CC}$ between $t_0$ and $t_2$. The delay period occurs between $t_0$ and $t_1$. In FIG. 9 $t_1$ is shown as adjustable to $-\Delta t_1$, or $+\Delta t_1$" to reflect the adjustment process described below. The measurement period occurs between $t_1$ and $t_2$. By delaying the measurement period by a known period of time, microprocessor overhead is reduced reducing the time that the microprocessor is dedicated to slavishly watching for the port bit to change.

Obviously, those of skill in the art will realize that the capacitor could be discharged rather than charged without departing from the invention; similarly the microprocessor could be set to increment rather than decrement without departing from the invention.

Block 42 represents the delay period. This period incorporates the offsets for increased ($+\Delta t_1$") or decreased ($-\Delta t_1$') delay which correspond to the automatic calibration discussed below. The delay period is referred to as a "delay value" below.

After the delay period is completed, control transfers to block 44 where the sensor value "SV" is measured by having the microprocessor count at a constant rate until the capacitor voltage reached $V_{CC}$. The result of the counting is a number value which is proportional to the resistance at that moment of the FSR being measured. Thus SV is, in effect, the digital value of the FSR in some arbitrary units and increasing resistance corresponds to a larger SV, a longer measurement time, and more pressure applied to the sensor.

Control is then passed to block 46 where, for a second time, the ON/OFF status of the J key is determined. Since a certain amount of time is spent to measure the pressure sensor ($t_2-t_1$), the J key ON/OFF status is checked twice (just before and just after the measurement) to determine if the key has been depressed during the pressure measurement (i.e., before or after it since it cannot be directly determined during the measurement). If the J key is determined to have been pressed during at least one of the two examinations, the routine concludes that an external pressure has been applied, and stops the self-calibration process. In this case, the measured sensor values will be transmitted to the system and no change in the calibration will occur. If the J key is found to be in the OFF state from both examinations, however, then the routine concludes that no external pressure has been applied and enters the self-calibration process.

Control passes to decision block 48. If at both inspections, the J key was in an OFF state (i.e., not depressed), then control passes to block 50, otherwise, the routine concludes that the J key was depressed during the measurement procedure and control passes to block 52. Block 50 is another decision block. The bias reference value or bias value or "BV" is simply a value designed to be mid-range of the possible sensor values. For example, where the range of possible sensor values is 0 to 106, BV=53. The tolerance or "T" is a tolerance value picked so that the system is not constantly trying to adjust itself against small values of random noise. A tolerance of T=3 has been found to work well for this particular embodiment.

In block 50, if SV>BV+T then control passes to transfer block 54. Otherwise control passes to decision block 56. At decision block 56, if SV<BV−T then control passes to transfer block 58. Otherwise control passes to block 52 where the Report Value, "RV" is set to SV From block 52 the routine ends at block 60 until called again. According to a presently preferred embodiment of the present invention, the routine is run each 60 ms.

Figure 5B:
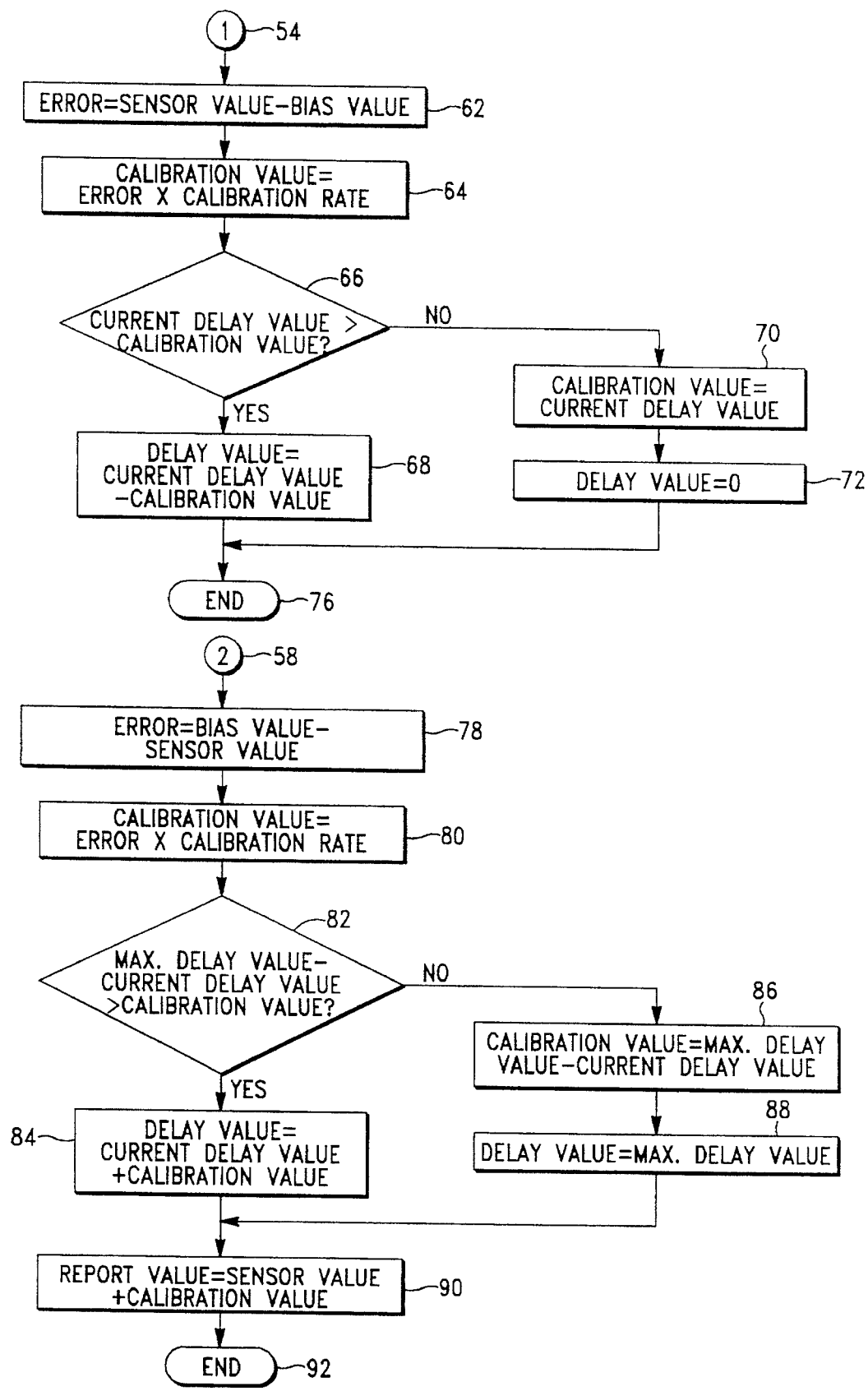

Turning to FIG. 5B, the continuation of the routine at block 54 transfers control to block 62 where an error value "E" is set to SV−BV. This corresponds to a situation where the unpressed J key pressure sensor is giving a reading out of tolerance on the high side. At block 64 a calibration value "CV" is set to E multiplied by a predetermined Calibration Rate "CR", thus CV=E * CR. Control now passes to decision block 66. At block 66, if the Current Delay Value "CDV" (the Delay Value obtained from the last pass of the Calibration Routine) is greater than the Calibration Value, i.e., if CDV>CV, then control transfers to block 68, otherwise control transfers to block 70. At block 70, the Calibration Value is set to the Current Delay Value, i.e., CV=CDV. Control passes to block 72 where the Delay Value is set to zero, i.e., DV=0. Control then passes to block 74 where the Report Value "RV" is set to the Sensor Value less the newly calculated Delay Value (successor to Current Delay Value), i.e., RV=SV−DV. Control is then passed to block 76 which ends the routine for the time being.

At block 68, reached from a YES decision in block 66, the new Delay Value is set to the Current Delay Value "CDV" less the Calibration Value, i.e., DV=CDV−CV (or, more simply, DV=DV−CV). Control then passes to blocks 74 and 76 as described above.

Block 58, reached from a YES decision in block 56 of FIG. 5A, passes control to block 78 where E=BV−SV. Control passes to block 80 where CV=E * CR. Control passes to decision block 82 where, if the Maximum Delay Value "MDV" less CDV is greater than CV, i.e., if MDV−CDV>CV, control passes to block 84, otherwise control passes to block 86. At block 86, CV=MDV− CDV. At block 88 which follows block 86, DV=MDV because the possible range of calibration is limited by the Maximum Delay Value. Control now passes to block 90. Since the current Sensor Value is obtained before the Delay Value is calibrated, the calibrated Sensor Value is obtained by adding the sensor value and Calibration Value, hence RV=SV+CV. Control then passes to block 92 where the routine ends with the transmission of the Calibrated Sensor Value ("RV") to the system.

At block 84, reached from a YES at block 82, DV=CDV+CV. Control then passes to block 90 as described above.

The Adjustment Value Calibration Method

Turning now to FIG. 6A the Adjustment Value Calibration Method is described. This method is used where the Sensor Value ("SV") is directly measured using an analog to digital converter. Specifically, in case the result is not within the range of the predetermined bias reference value BV plus or minus the predetermined tolerance value T, this method allows the measured sensor value to reach the bias reference value by adding or subtracting the Adjustment Value "AV" to or from the result of subtraction of the adjustment value from the actual measured value.

The routine starts at block 100 and transfers control to block 102. Block 102 carries out a first ON/OFF status check of the J key as described above. A direct sensor value measurement using an analog to digital converter is performed at block 104 giving a value for SV directly. A second ON/OFF status check of the J key is carried out at block 106. At block 108, since the Sensor Value is obtained without taking account of the Adjustment Value, the Adjustment Value will be subtracted from the measured Sensor Value, therefore, the Sensor Value "SV" is set to the measured Sensor Value less the Adjustment Value "AV", i.e., SV=SV−AV. Control then passes to decision block 110 where the J key status is analyzed. If the J key was OFF both times it was checked in blocks 102 and 106, it is concluded that the key was not depressed and control passes to block 112 where the self-calibration process proceeds, otherwise control passes to block 114. At block 112, if SV>BV+T then control passes to transfer block 116. This corresponds to a situation where the unpressed sensor has drifted upward in value beyond the range provided by the tolerance value. If SV≦BV+T, control passes to decision block 118. At block 118, if SV<BV−T then control passes to transfer block 120. This corresponds to a situation where the unpressed sensor has drifted downward in value beyond the range provided by the tolerance value. If SV≧BV−T, then control passes to block 114 where it is concluded that the key was depressed during measurement and the Sensor Value is to be passed to the computer for processing. At block 114, RV=SV and control passes to block 122 where the routine ends.

Figure 6B:
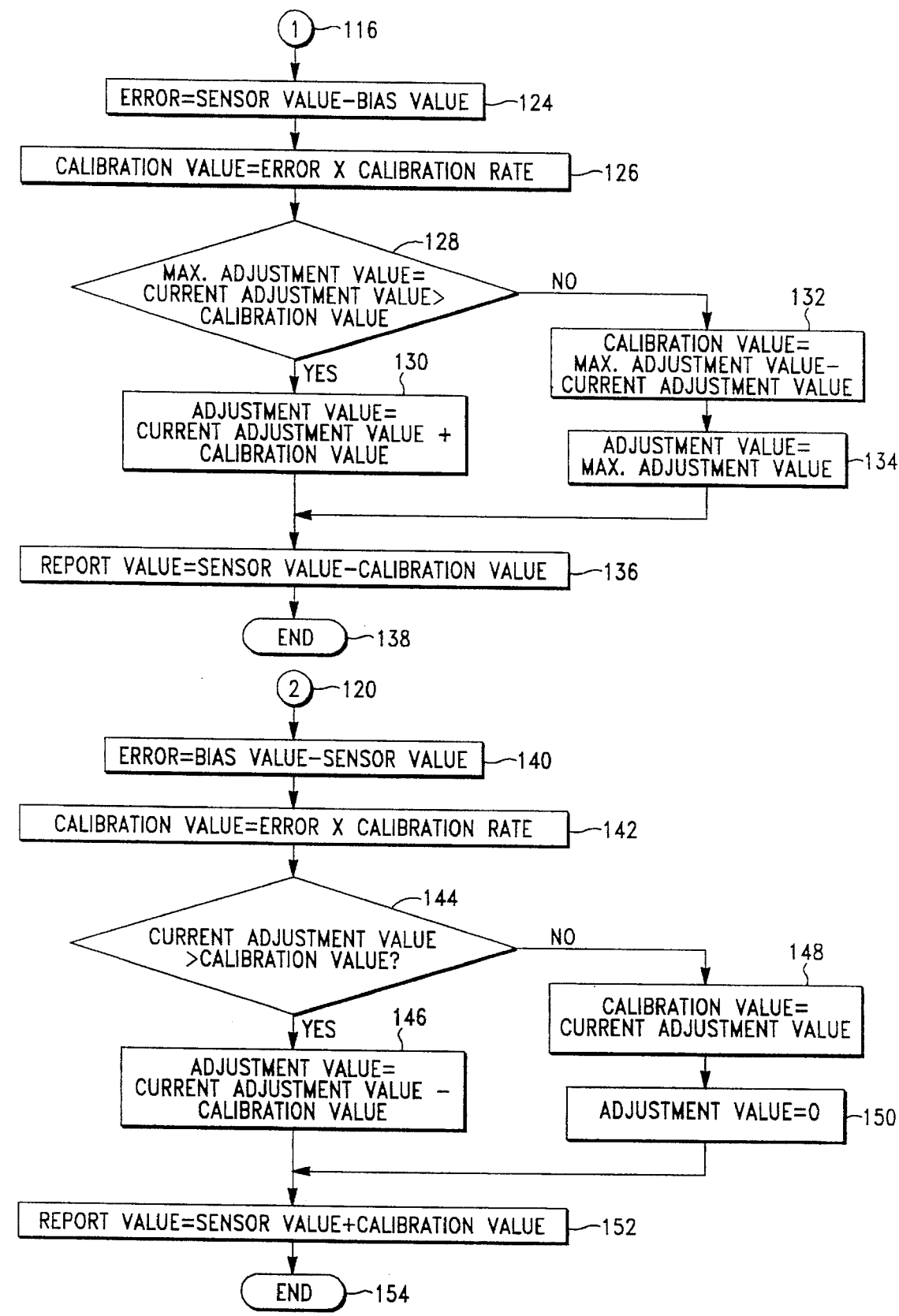

Turning to FIG. 6B, transfer block 116 passes control to block 124 where E=SV−BV. At block 126 CV=E * CR. At decision block 128, if the Maximum Adjustment Value "MAV" (a predetermined value) less the Current Adjustment Value "CAV" is greater than the Calibration Value "CV", i.e., if MAV−CAV>CV, then control passes to block 130. Otherwise control passes to block 132. At block 132 CV=MAV−CAV. At block 134, Adjustment Value "AV" (the new value for CAV) is set to MAV, i.e., AV=MAV. Control then passes to block 136.

At block 130, reached from a YES at block 128, AV=CAV+CV. Control then passes to block 136 where RV=SV−CV. Control then passes to block 138 where the routine ends.

Transfer block 120 passes control to block 140 where E=BV−SV. At block 142 CV=E * CR. At decision block 144, if CAV>CV control passes to block 146, otherwise control passes to block 148 where CV=CAV and block 150 where AV=0. Control then passes to block 152 where RV=SV+CV and block 154 where the routine ends. If control is passed to block 146, AV=CAV− CV and control passes to block 152 as described above.

EXAMPLES

Figure 7:
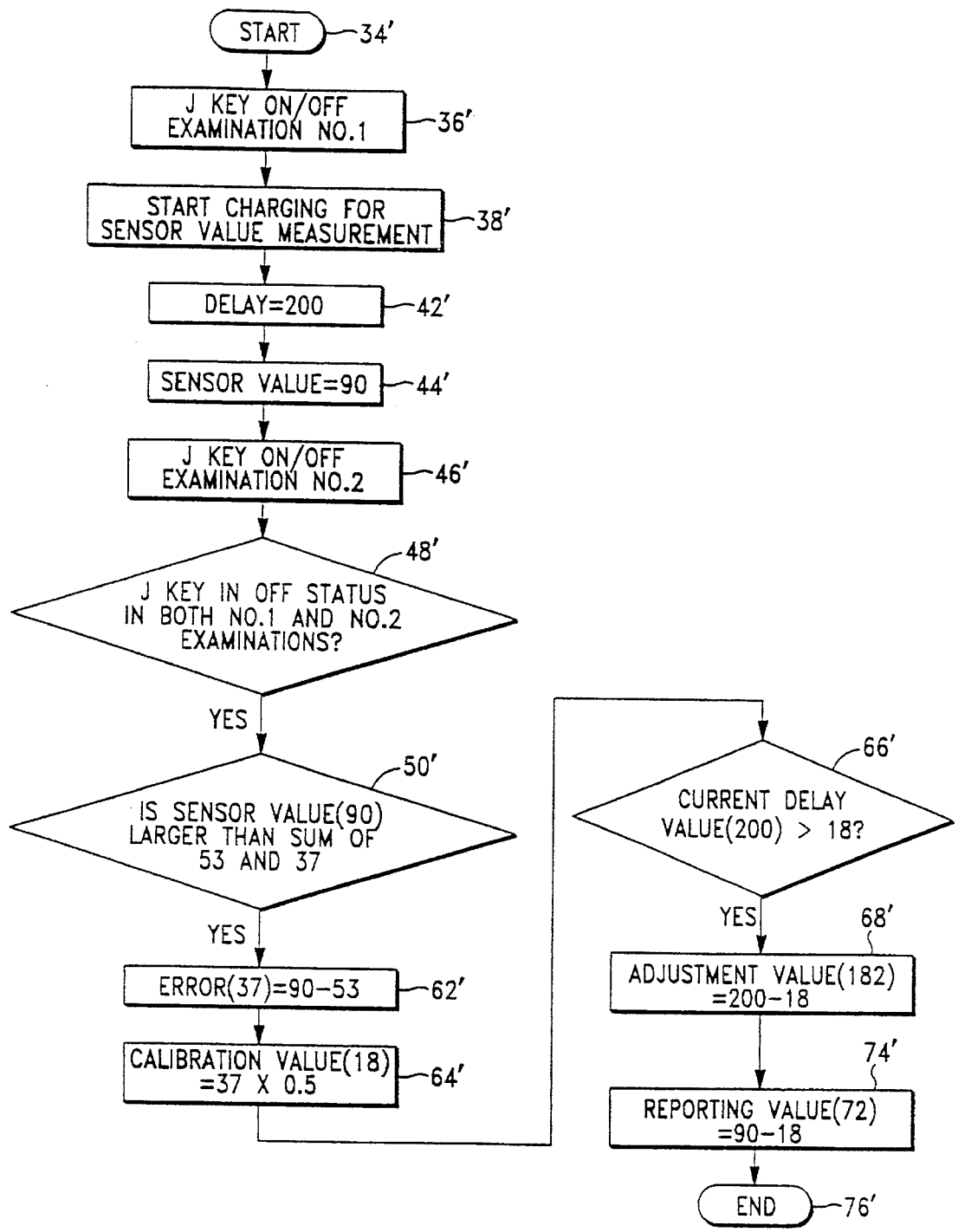
FIG. 7 is a flow chart describing the Delay Value Calibration Method of self-calibration starting with a given condition.

To better understand the preceding, examples are set forth below. FIG. 7 is an example of the operation of the Delay Value Calibration Method. In the example set forth in FIG. 7, the following are initial conditions: Initial Delay Value= 200. BV=53, T=3, CR=0.50, SV (measured)=90, J key=OFF both times. The program blocks in FIG. 7 are numbered to correspond with the blocks in FIGS. 5A and 5B.

Figure 8:
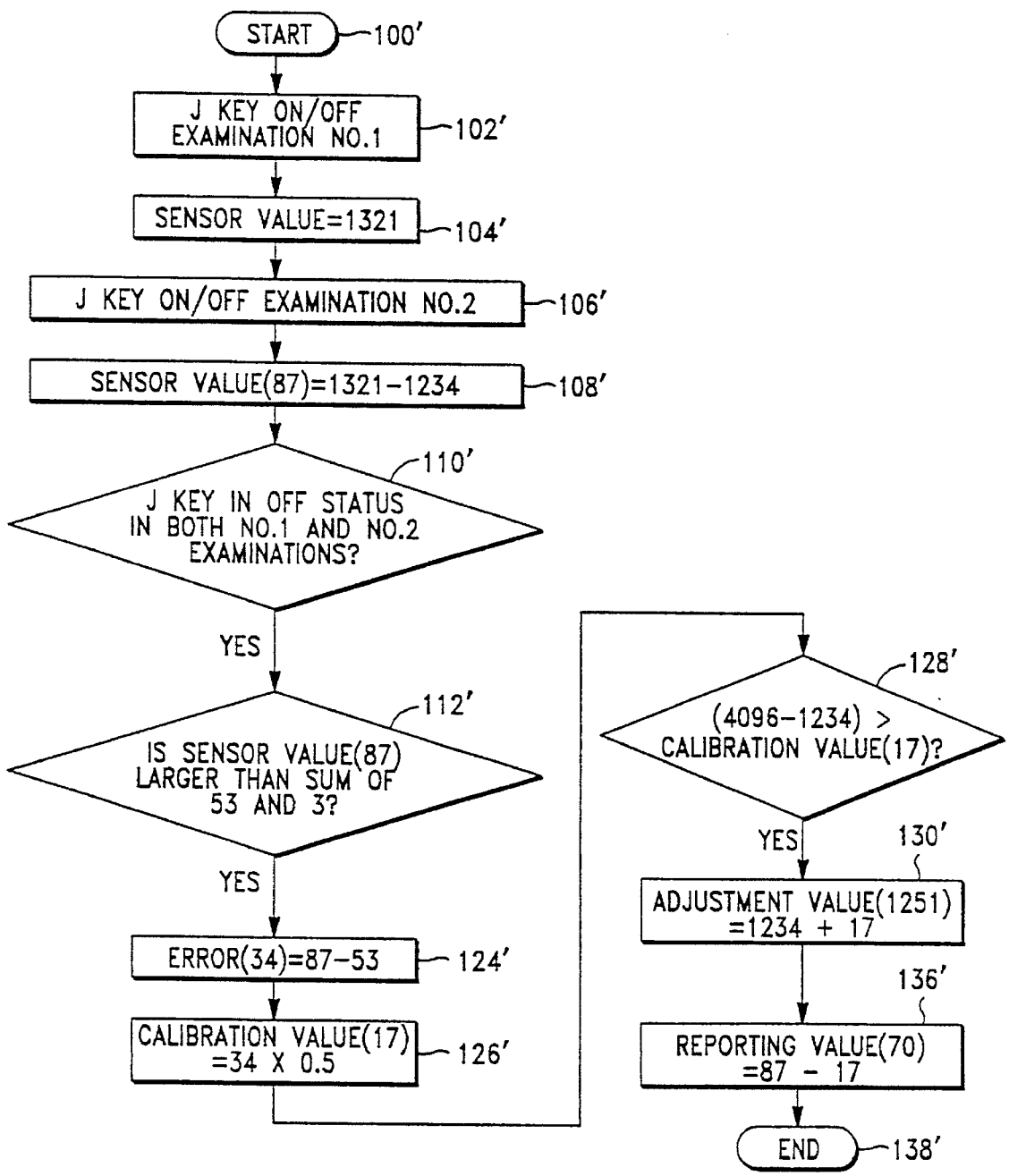
FIG. 8 is a flow chart describing the Adjustment Value Calibration Method of self-calibration starting with a given condition.

FIG. 8 is an example of the Adjustment Value Calibration Method. In the example set forth in FIG. 8, the following are initial conditions: Initial adjustment value=1234, BV=53, T=3, CR=0.50, SV (measured)=1321, J key=OFF both times, MAV=4096. The program blocks in FIG. 8 are numbered to correspond with the blocks in FIGS. 6A and 6B.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A method of self-calibration for an FSR-type force detecting sensor associated with a typing key in a computer keyboard including the steps of:

charging an RC circuit comprising a fixed capacitor and the FSR-type force detecting sensor from a first voltage value to a second voltage value over a period of time comprising a first period and a second period to obtain a present calibration state of the FSR-type force detecting sensor;

charging the RC circuit during said first period having a predetermined delay time to increase the first voltage value;

charging the RC circuit during said second period having a variable delay time which begins at the end of said predetermined delay time and ends when said RC circuit has reached said second voltage value;

generating a numerical value associated with said variable delay time;

detecting whether or not the typing key was depressed either just prior or just subsequent to said periods of time and continuing with the self-calibration for the FSR-type force detecting sensor only if the typing key was not so depressed; and if said numerical value is out of range of a predetermined bias value plus or minus a predetermined tolerance value, adjusting the length of said predetermined delay time in response to the magnitude of the difference between said bias value and said numerical value multiplied by a predetermined calibration rate to set a new value for said predetermined delay time which calibrates the FSR-type force detecting sensor.

2. A method of self-calibration for an FSR-type force detecting sensor associated with a pointing device including the steps of:

charging an RC circuit comprising a fixed capacitor and the FSR-type force detecting sensor from a first voltage value to a second voltage value over a period of time comprising a first period and a second period to obtain a present calibration state of the FSR-type force detecting sensor;

charging the RC circuit during said first period having a predetermined delay time to increase the first voltage value;

charging the RC circuit during said second period having a variable delay time which begins at the end of said predetermined delay time and ends when said RC circuit has reached said second voltage value;

generating a numerical value associated with said variable delay time;

detecting whether or not the pointing device was in use either just prior or just subsequent to said periods of time and continuing with the self-calibration for the FSR-type force detecting sensor only if the pointing device was not in use; and if said numerical value is out of range of a predetermined bias value plus or minus a predetermined tolerance value, adjusting the length of said predetermined delay time in response to the magnitude of the difference between said bias value and said numerical value multiplied by a predetermined calibration rate to set a new value for said predetermined delay time which calibrates the FSR-type force detecting sensor.

* * * * *